Figure 1:
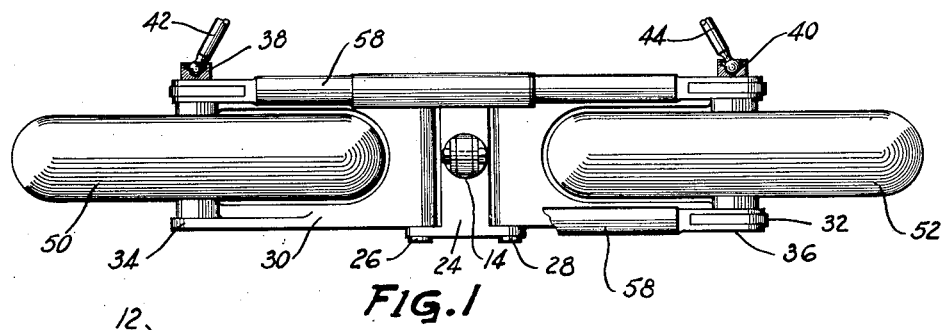

Sept. 20, 1938.                K. W. WARREN                  2,130,914
                                SHOCK STRUT
                       Original Filed Sept. 14, 1931

INVENTOR.
KENNETH W. WARREN
BY O. H. Fowler
ATTORNEY.

Patented Sept. 20, 1938

2,130,914

UNITED STATES PATENT OFFICE 2,130,914

SHOCK STRUT

Kenneth W. Warren, South Bend, Ind., assignor to Bendix Aviation Corporation, South Bend, Ind., a corporation of Delaware Application September 14, 1931, Serial No. 562,624
Renewed January 12, 1937

3 Claims. (Cl. 244—103)

This invention relates to landing gears for aircraft and more particularly to shock absorbing landing gears.

Broadly, the invention comprehends a simplified and advanced multi-wheel shock absorbing landing gear for large airplanes. The invention possesses several advantages over the prior art among which are: simple and direct structural trussing, long stroke shock absorbing elements of relatively small diameter, and positive assurance of an equal distribution of the load.

An object of the invention is to provide a shock absorbing landing gear in which the head resistance is greatly reduced.

Another object of the invention is to provide a shock absorbing landing gear having tandem wheels each arranged to take its share of the load.

Another object of the invention is to provide a shock absorbing landing gear in which the weight of such a structure may be materially reduced.

A feature of the invention is a shock absorbing landing gear having simple and direct structural trussing.

Another feature of the invention is a shock absorbing landing gear of light structure in which two small wheels are used in tandem instead of one large wheel.

A further feature of the invention is a shock absorbing landing gear having positive action, high efficiency in operation, and marked simplicity as a whole and in respect to each of its component parts.

Figure 2:
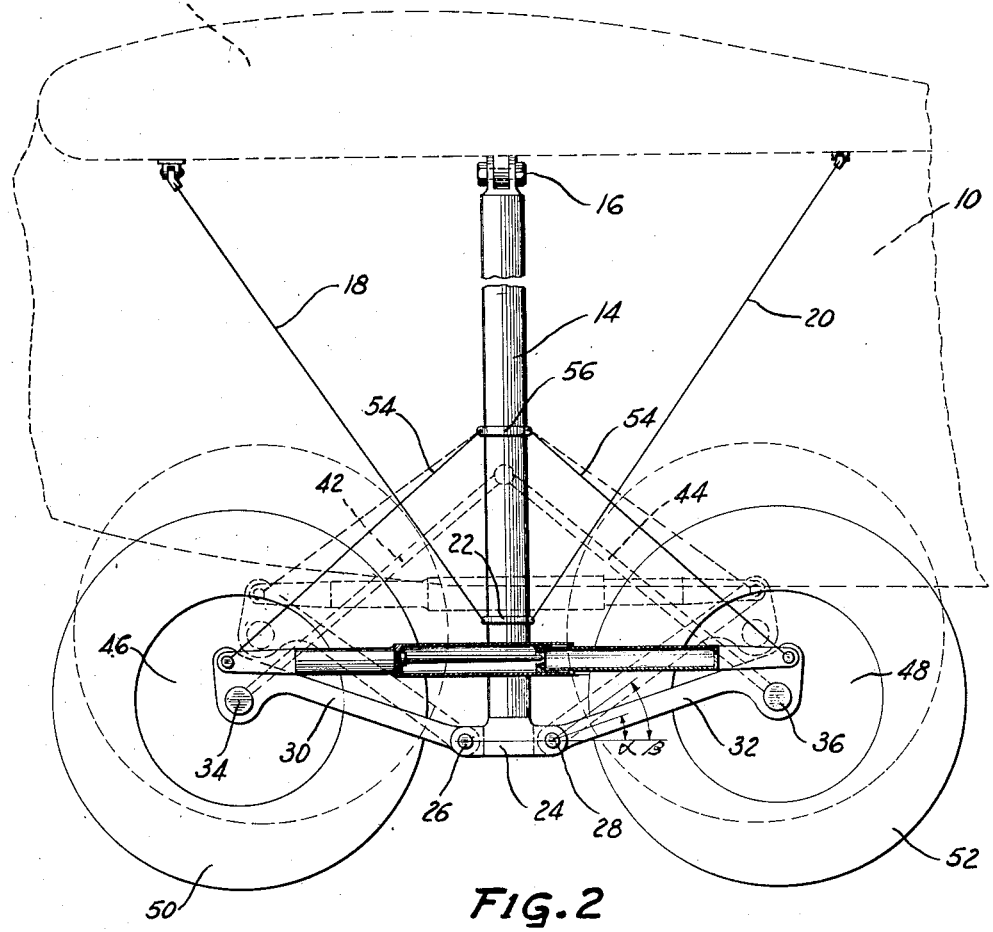

Other objects and features of the invention will appear from the following description taken in connection with the drawing, forming a part of this specification, and in which:

Figure 1 is a top plan view partly broken away to better illustrate the mounting for the tandem wheels, and Figure 2 is a side elevation of an airplane partly broken away illustrating the shock strut assembly attached. The strut is shown in full lines in the fully extended position and in dotted lines in the collapsed position.

Referring to the drawing for more specific details of the invention, 10 represents the fuselage of an airplane and 12 the wings of the plane. As shown, a vertical strut 14 has at one end a clevis 16 by which it may be hinged to the wing of a plane. This strut is further secured to the wing by drag wires or struts 18 and 20 connected between the wing and a collar 22 suitably secured on the strut 14. The strut 14 and drag wires or struts 18 and 20 are hinged to the wing about a common axis. The other end of the strut 14 supports a head 24 having oppositely disposed lugs 26 and 28 arranged in pairs, the object of which will hereinafter appear.

Pivotally secured between each pair of the lugs 26 and 28 are corresponding forked or bifurcated members 30 and 32 each having secured between their bifurcated ends axles 34 and 36 connected through universal joints 38 and 40 and struts 42 and 44 to the fuselage of the plane, and positioned for rotation on the axles 34 and 36 are wheels 46 and 48 equipped with conventional pneumatic tires 50 and 52. Struts 42 and 44 may be joined to the fuselage by universal joints at a common point as shown, or they may be joined to the fuselage by universal joints at different points.

The bifurcated ends of the members 30 and 32 are connected by elastic cords or cables 54 to a collar 56 on the strut 14. These cords or cables retain the wheels in proper position when the plane is in flight. As shown, the members 30 and 32 are connected together by combined hydraulic and pneumatic shock absorbing units 58. The shock absorbing element, and the taxying element may be of any preferred type. As shown, this unit includes telescopic cylindrical sections one of which has positioned therein a diaphragm provided with an orifice, and the other carries a metering pin for cooperation with the orifice. It is, of course, understood that the cylinders are filled with a suitable liquid and air or gas under pressure.

It will be observed that the forked or bifurcated members 30 and 32 are tension members which may be relatively light, and the shock absorbing elements or the combined hydraulic, and pneumatic members 58 are compression members and there are two of these members in the assembly, and hence they may be of relatively small diameter. This materially lightens the structure and greatly reduces the cost of production.

It can be shown as follows: that where the load transmitted to the landing gear through the vertical strut 14 is equal to one-half the weight of the plane, which may be designated X.

Then, with the shock strut fully extended the tension load in members 30 and 32 would be:

$$\frac{X}{2} \times \frac{1}{\sin \alpha}$$

For the case shown, $\alpha$=approximately 18°. Therefore:

$$\text{Tension} = \frac{X}{2 \times .309} = 1.62 \times X$$

$$\text{Compression in struts 58 (2)} = \frac{X}{2} \times \cot \alpha$$

$$= \frac{X \times 3.08}{2}$$

$$= 1.54 \times X$$

Therefore:

$$\text{Compression in each strut} = \frac{1.54X}{2} = .77 \times X$$

With the shock strut fully compressed, the tension load in members 30 and 32 would be:

$$\frac{X}{2} \times \frac{1}{\sin \beta}$$

$\beta$=approximately 35°
Therefore:

$$\text{Tension} = \frac{X}{2 \times .574} = .872 \times X$$

$$\text{Compression in struts 58 (2)} = \frac{X}{2} \times \cot \beta$$

$$= \frac{X \times 1.428}{2}$$

$$= .715 \times X$$

Therefore:

$$\text{Compression in each strut} = \frac{.715 \times X}{2}$$

$$= .358 \times X$$

In this instance the X will represent a load of approximately three times the normal load.

At the maximum compressed position the gear as shown will have no bending stress in the members 30 and 32. At other points in the stroke there will be some bending produced in members 30 and 32. However, the axle and shock strut hinge point can be so located as to change this relation as desired.

In some cases it might be possible to run both the shock strut 58 and the members 30 and 32 directly to the center of the axle and still have sufficient vertical wheel travel. This would eliminate any bending in the members 30 and 32.

In the illustrated embodiment there will be a total of approximately thirteen inches of shock strut travel for six inches of wheel travel, which will make the problem of dissipating the necessary energy relatively simple. The relative amount of wheel and shock strut travel can be altered somewhat by changing the position of the hinge points.

Although this invention has been described in connection with certain specific embodiments, the principles involved are susceptible of numerous other applications that will readily occur to persons skilled in the art. The invention, is therefore, to be limited only as indicated by the scope of the appended claims.

Having thus described the various features of the invention, what I desire to secure by Letters Patent is:

1. A landing gear comprising a rigid member, a clevis on one end of the member, a head on the other end of the member, bifurcated members pivotally connected to the head, axles supported by the bifurcated members, wheels positioned for rotation on the axles between the arms of the bifurcated members, compression elements connecting the corresponding arms of the bifurcated members, and means for limiting movement of the compression elements in one direction.

2. A landing gear comprising a rigid member, a clevis on one end of the member, a head on the other end of the member, bifurcated members pivoted on the head, parallel axles supported between the arms of the bifurcated members, wheels positioned for rotation on the axles, compression elements connecting the corresponding arms of the bifurcated members, and tension members connecting the bifurcated members to the rigid member.

3. In an airplane landing gear, a support, a pair of arms pivotally mounted at one end on said support, one of said arms extending forward and upward and the other rearward and upward, a horizontal forward and rearward extending resilient compression means connected between the other or free ends of said arms at a point on each of said arms above the pivots of said arms on said support, and a wheel carried adjacent the free end of each of said arms.

KENNETH W. WARREN.